United States Patent
Post, II et al.

(10) Patent No.: US 8,321,110 B2
(45) Date of Patent: Nov. 27, 2012

(54) DETECTION OF HILL GRADE AND FEED-FORWARD DISTRIBUTION OF 4WD TORQUE BIAS TO IMPROVE TRACTION ON A LOW MU SURFACES DURING CLIMBING OF SUCH HILL GRADE

(75) Inventors: James W. Post, II, Dublin, OH (US); Theodore Klaus, Marysville, OH (US); Xiaodi Kang, Raymond, OH (US)

(73) Assignee: Honda Motor Co., Ltd., Tokyo (JP)

( * ) Notice: Subject to any disclaimer, the term of this patent is extended or adjusted under 35 U.S.C. 154(b) by 1817 days.

(21) Appl. No.: 11/294,786

(22) Filed: Dec. 6, 2005

(65) Prior Publication Data

US 2007/0129871 A1   Jun. 7, 2007

(51) Int. Cl.
G06F 7/00 (2006.01)
G06F 17/00 (2006.01)
G06F 19/00 (2011.01)

(52) U.S. Cl. .......................................... 701/69; 477/901
(58) Field of Classification Search .................. 701/69
See application file for complete search history.

(56) References Cited

U.S. PATENT DOCUMENTS

| | | | |
|---|---|---|---|
| 4,825,368 A | 4/1989 | Itoh et al. | |
| 5,033,002 A | 7/1991 | Sol | |
| 5,043,896 A | 8/1991 | Sol | |
| 5,070,960 A | 12/1991 | Nobumoto et al. | |
| 5,132,906 A | 7/1992 | Sol et al. | |
| 5,178,231 A | 1/1993 | Watanabe et al. | |
| 6,094,614 A | 7/2000 | Hiwatashi | |
| 6,169,949 B1 | 1/2001 | Sato | |
| 6,584,399 B2 | 6/2003 | Koibuchi | |
| 6,604,595 B2 * | 8/2003 | Sakakiyama | 180/233 |
| 6,634,451 B2 * | 10/2003 | Sakakiyama | 180/197 |
| 6,697,725 B1 | 2/2004 | Williams | |

* cited by examiner

*Primary Examiner* — Khoi Tran
*Assistant Examiner* — Nicholas Kiswanto
(74) *Attorney, Agent, or Firm* — Mark E. Duell; Rankin, Hill & Clark LLP

(57) ABSTRACT

A feed forward method for controlling the distribution of torque between the front and rear axle in a four wheel drive vehicle where the slope of a hill upon which the vehicle is traveling is calculated based on measured vehicle longitudinal acceleration and estimated longitudinal acceleration. The hill slope estimation is made and implemented before the wheels of the vehicle begin to slip due to the slope and low friction coefficient of the road surface. Under conditions of high vehicle speeds or severe vehicle turning, the change of torque distribution is not implemented because there is a lesser tendency for the vehicle to slip on the hill surface.

9 Claims, 2 Drawing Sheets

DETECTION OF HILL GRADE AND FEED-FORWARD DISTRIBUTION OF 4WD TORQUE BIAS TO IMPROVE TRACTION ON A LOW MU SURFACES DURING CLIMBING OF SUCH HILL GRADE

BACKGROUND OF THE INVENTION

1. Field of the Invention

The invention is directed to a method of improving stability and performance of a four wheel drive vehicle, specifically through feed forward control that includes shifting torque from front to rear axles when the vehicle encounters a hill having a road surface with a low coefficient of friction.

2. Description of the Related Art

Typical four wheel drive vehicles now include means for shifting drive torque between the front and rear axles of the vehicle. Shifting is required in response to changing road conditions and/or driver requests transmitted via the accelerator pedal or steering wheel. When driving upwards on an incline, such as a hill, the weight of the vehicle rests in a greater percentage on the rear axle. Correspondingly, more drive torque should be shifted to the rear axle to maintain superior vehicle performance and handling. This distribution favoring the rear axle is especially important when the road on which the vehicle is traveling has a low coefficient of friction. Low friction situations are caused by snow, ice, mud, etc. Increased application of drive torque is a significant factor that minimizes slipping caused by low friction situations.

Shifting from a torque distribution ratio favoring the front axle or an even distribution, both of which are common when driving on a generally level surface, must be instigated by sensing changed road conditions. Typically, changed road conditions are sensed by recognizing slippage of the vehicle wheels. For example, when a vehicle traveling on a level road, with a torque distribution favoring the front axle, reaches a snow covered hill and begins to drive upward, slippage of the front vehicle wheels is first sensed. The slip condition is fed into an algorithm in the vehicle's onboard computer and resulting instructions shift torque from the front axle to the rear axle of the vehicle.

As a result of the procedure described above, the vehicle must be on a hill and in a slipping condition before an adjustment is made by the vehicle control system. The control system may, as a result, have limited effectiveness in terms of quickness and accuracy in compensation and achieving a smooth transition as felt by the vehicle driver.

An improved method for shifting torque between vehicle axles when encountering a hill, particularly a hill with conditions that reduce road friction, is desired.

SUMMARY OF THE INVENTION

The known torque distribution controller is usually designed to operate solely in a wheel slip-based feed back manner. However, it does not, in the current state of the art, have the capability to shift torque directly in response to recognition of hill slope rather than responding to the indirect effects of hill slope on wheel slippage.

In a preferred method of practicing the invention, the torque distribution ratio between front and rear axles of a four wheel drive vehicle is changed utilizing feed forward control when the vehicle encounters a hill, particularly a hill where the road surface has a low coefficient of friction. The method includes repeatedly measuring the speed of the individual wheels of the vehicle and calculating the rate of speed change in each wheel, measuring the longitudinal acceleration of the vehicle and then calculating an estimated value of hill slope based on an estimated longitudinal acceleration from the measured wheel speeds and the measured longitudinal acceleration. The estimated value of hill slope is then used to calculate a desired torque distribution ratio change and to shift torque typically from the front axle of the vehicle to the rear axle of the vehicle.

The method of shifting torque in a feed forward manner is mitigated by vehicle operating conditions. Specifically, if the vehicle is traveling faster than a threshold speed, feed forward control is mitigated or not used. Also if the vehicle is not traveling in generally a straightforward direction, but is instead turning, feed forward control is mitigated or not used.

These and other aspects of the invention are herein described in particularized detail with reference to the accompanying figures.

DETAILED DESCRIPTION OF THE PREFERRED EMBODIMENTS

A new torque shifting concept can now allow compensation for the factors encountered by a vehicle when proceeding up a hill prior to the slipping of the vehicle's front wheels. This concept, as described in more detail below, includes feed forward control that works in conjunction with traditional feed back based torque control that relies on sensed slipping conditions. However, operation of the feed forward control concept significantly reduces wheel slippage and as a result the traditional feed back concept makes fewer additional corrections.

Figure 1:
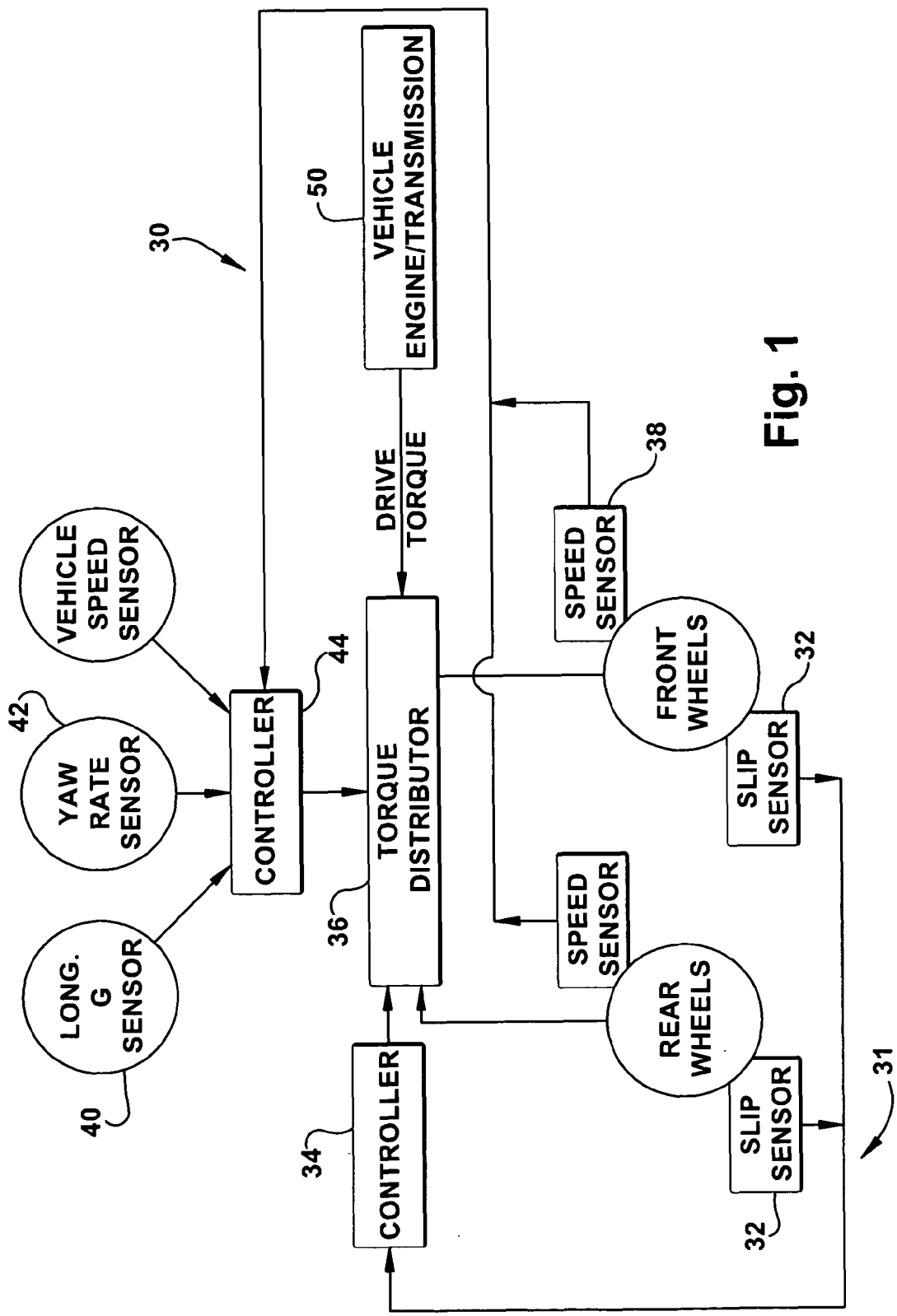
FIG. 1 is a schematic representation of a method of shifting torque between vehicle axles according to the present invention.

FIG. 1 presents the basic function of the feed forward control methodology 30 in combination with wheel slip-based feed back methodology 31. Components used in the slip-based feed back methodology include wheel slip sensors 32, a controller 34 and a torque distribution device 36. When slippage of the wheels is first sensed, the slip condition is fed into an algorithm in the controller 34 and resulting instructions cause the torque distribution device 36 to change the distribution of torque between the front axle and the rear axle of the vehicle. The feed forward control methodology 30 uses components including wheel speed sensors 38, a longitudinal acceleration sensor 40, a yaw rate sensor 42, a controller 44 in addition to the torque distribution device 36 noted above. The distribution device 36 directs drive torque generated by the vehicle engine and transmission 50 to both the front and rear axles of the vehicle at a ratio that may be easily changed. The ratio of front to rear axle torque is also referred to herein as torque bias.

Upon encountering a hill while driving forward, it is necessary to shift torque, typically from the front axle to the rear axle, particularly if the frictional coefficient of the road surface is low. A shift is required because the rear axle supports a large load when the vehicle is upon the incline of the hill. The amount of torque shifted from the front axle to the rear axle is a function of the slope of the hill.

An estimation of the slope of the hill is made using measured wheel speeds, measured by speed sensors 38, and the longitudinal acceleration of the vehicle measured by the longitudinal acceleration sensor 40. The wheel speeds, from all four vehicle wheels, are measured repeatedly over short intervals of time. The rate of wheel speed change is also calculated for each wheel, particularly the rate of change of rear wheel speed, and represents a calculated longitudinal acceleration.

Figure 2:
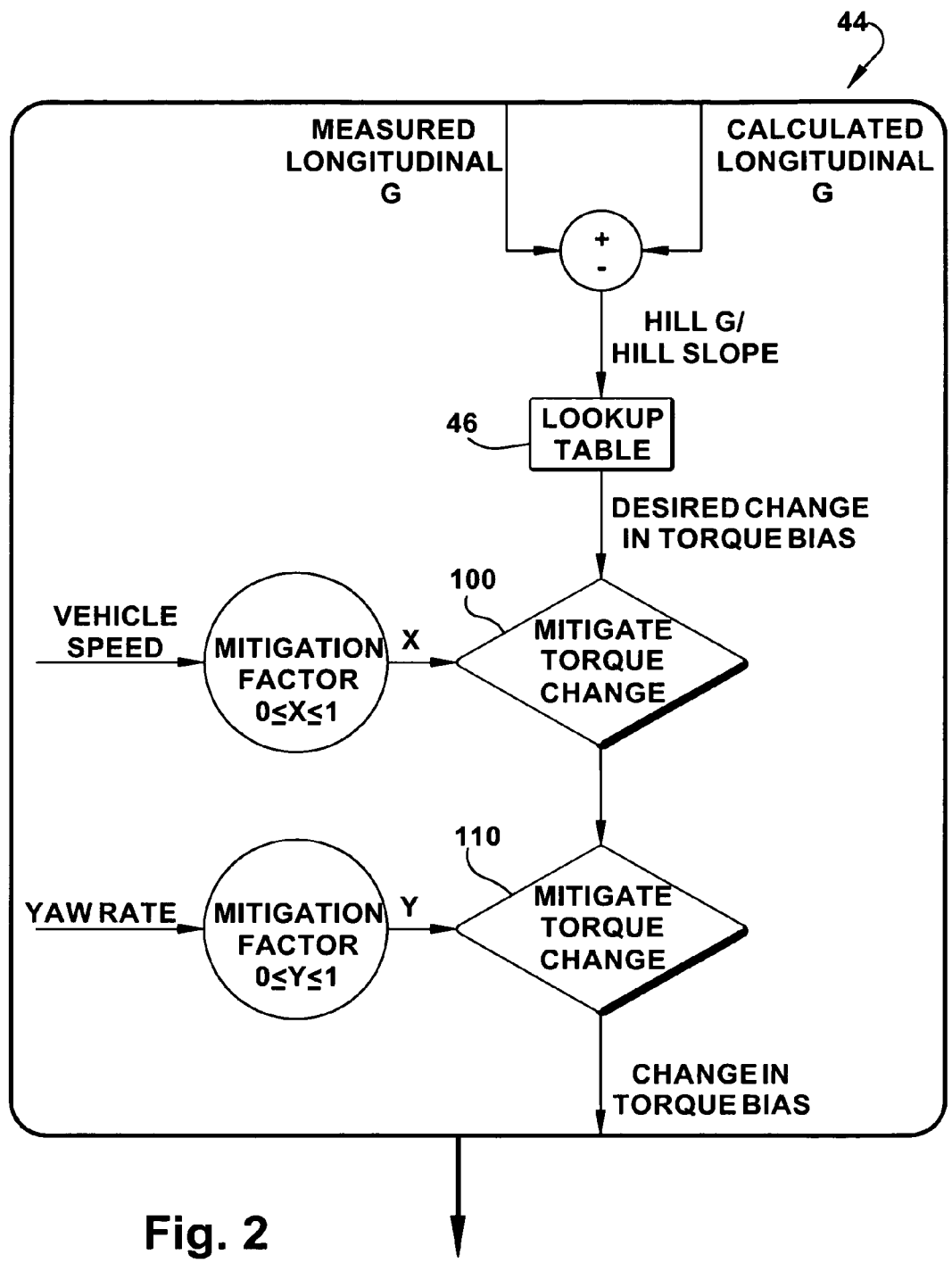
FIG. 2 is a schematic representation of a method of calculating, then mitigating a desired change of torque bias in the present invention.

Referring to FIG. 2, the calculated longitudinal acceleration is compared to the measured longitudinal acceleration within the controller 44. The difference between the calculated and measured longitudinal acceleration is referred to as the hill acceleration (hill "G"). Based on the relationship between these measured and calculated values, an estimated hill slope is determined.

The estimated hill slope is used in conjunction with a conversion/lookup table 46, stored in an electronic form in the controller 44, to provide a desired change in the ratio of front to rear axle torque. The change is made to the value of the front to rear ratio that has already been determined by a variety of known vehicle control systems operating in the vehicle.

The change of the front to rear axle torque bias based on a recognized hill angle occurs only in a narrow pre-defined operating region as described below. Specifically, when the vehicle is operating outside of the pre-defined region, the front to rear bias change as a result of the sensed hill is reduced or zero. A first condition 100 that defines the operating region and thus limits the change in torque bias is vehicle speed, particularly higher speeds. Preferably, when the vehicle is traveling above a threshold speed, a mitigation factor between 0 and 1.0 is determined and used to mitigate the desired change in torque bias. A second condition 110 that limits changes in torque bias is the vehicle's direction of travel. When the vehicle is not traveling in a generally straight direction, as defined by plus or minus five degrees/second of yaw rate, but is instead turning, a second mitigation factor between 0 and 1.0 is determined and used to mitigate the desired change in torque bias. Referring back to FIG. 1, the torque distributor 36 implements a shift of torque to meet the desired ratio change.

Adjustment of torque distribution ratio based on wheel slippage is a typical instance of feed back control. Changes to the torque applied to the individual wheels have a direct effect on wheel slip and this affect is noticed during subsequent measurements of wheel slip. On the other hand, adjustment of wheel torque based on measured hill slope employs feed forward control. Hill slope variations may be measured prior to them having any affect on wheel slip and variations to torque distribution ratio may be made and implemented based on experimentally determined or calculated relationships in order to compensate for the expected effects. Accordingly, the torque distribution system of the present invention is proactive, rather than reactive, and provides better control and smoother vehicle travel up hills. Additionally, the feed forward control improves the vehicle's ability to start up a hill from a stopped condition on a slippery surface.

The system is described for use in a vehicle having a known VSA (vehicle stability assist) system, but may be also used with any type of system capable of torque shifting between the front and rear axles in a four wheel drive vehicle. The longitudinal acceleration sensor preferably is part of the vehicle's existing VSA system, but may be an added component if the vehicle is not provided with a VSA system.

Although the invention has been shown and described with reference to certain preferred and alternate embodiments, the invention is not limited to these specific embodiments. Minor variations and insubstantial differences in the various combinations of materials and methods of application may occur to those of ordinary skill in the art while remaining within the scope of the invention as claimed and equivalents.

What is claimed is:

1. A method of changing torque distribution between front and rear axles of a four wheel drive vehicle on a hill comprising:

measuring the speed of individual wheels;
calculating an estimated value of longitudinal acceleration using the measured wheel speed;
measuring the longitudinal acceleration of the vehicle using a sensor;
calculating an estimated value of hill slope based on the estimated value of longitudinal acceleration and measured value of longitudinal acceleration;
using the estimated value of hill slope to determine a torque shift from the front axle of the vehicle to the rear axle of the vehicle;
after determining a torque shift via the estimated hill slope, measuring the speed of the vehicle and mitigating the determined torque shift if the speed exceeds a threshold value; and
implementing the mitigated torque shift by shifting torque from the front axle to the rear axle or vise-versa.

2. The method of claim 1, wherein torque is shifted from the front axle to the rear axle of the vehicle before the front wheels of the vehicle slip due to the slope and coefficient of friction of the hill.

3. The method of claim 1, wherein the step of measuring the speed of individual wheels includes measuring the speed of all four vehicle wheels.

4. The method of claim 1, wherein the step of measuring the speed of individual wheels includes measuring the speed of the wheels on the rear axle at two separate times and the step of calculating an estimated value longitudinal acceleration includes calculating the rate of speed change of the wheels on the rear axle between the separate times.

5. The method of claim 1 further including the step of controlling slippage of the vehicle wheels in a feed back based manner.

6. A method of changing torque distribution between front and rear axles of a four wheel drive vehicle on a hill comprising:

measuring the speed of individual wheels;
calculating an estimated value of longitudinal acceleration using the measured wheel speed;
measuring the longitudinal acceleration of the vehicle using a sensor;
calculating an estimated value of hill slope based on the estimated value of longitudinal acceleration and measured value of longitudinal acceleration;
using the estimated value of hill slope to determine a torque shift from the front axle of the vehicle to the rear axle of the vehicle; and
after determining a torque shift via the estimated hill slope, measuring the yaw rate of the vehicle and mitigating the determined shift of torque if the vehicle is not traveling in a generally straight ahead direction; and
implementing the mitigated torque shift by shifting torque from the front axle to the rear axle or vise-versa.

7. The method of claim 6, wherein torque is shifted from the front axle to the rear axle of the vehicle before the front wheels of the vehicle slip due to the slope and coefficient of friction of the hill.

8. The method of claim 6, further including the step of measuring the speed of the vehicle and mitigating the shift of torque if the speed exceeds a threshold value.

9. The method of claim 6, further including the step of measuring the yaw rate of the vehicle and mitigating the shift of torque if the vehicle is not traveling in a generally straight ahead direction.

* * * * *